United States Patent
Hui

(10) Patent No.: US 6,581,766 B2
(45) Date of Patent: Jun. 24, 2003

(54) CASE WITH MEMBERS FOR IMPEDING DISC REMOVAL

(75) Inventor: Yi Ming Hui, Tai Tam (HK)

(73) Assignee: Dragon Plan Limited, Chai Wan (HK)

( * ) Notice: Subject to any disclaimer, the term of this patent is extended or adjusted under 35 U.S.C. 154(b) by 0 days.

(21) Appl. No.: 09/871,878

(22) Filed: Jun. 4, 2001

(65) Prior Publication Data

US 2002/0179465 A1 Dec. 5, 2002

(51) Int. Cl.[7] .............................................. B65D 85/57
(52) U.S. Cl. .................... 206/308.1; 206/310; 206/472; 206/493
(58) Field of Search ............................. 206/308.1, 309, 206/310–313, 472, 473, 303, 493, 495, 478, 480, 483

(56) References Cited

U.S. PATENT DOCUMENTS

| | | | | |
|---|---|---|---|---|
| 2,546,470 A | * | 3/1951 | Mueller | 206/310 |
| 4,886,166 A | * | 12/1989 | Bankier et al. | 190/102 |
| 5,263,580 A | * | 11/1993 | Ciba et al. | 206/308.1 |
| 5,551,560 A | * | 9/1996 | Weisburn et al. | 206/308.1 |
| 5,638,952 A | * | 6/1997 | Kim | 206/307.1 |
| 5,788,068 A | * | 8/1998 | Fraser et al. | 206/308.1 |
| 5,899,327 A | * | 5/1999 | Sykes | 206/307.1 |
| 5,931,291 A | * | 8/1999 | Sedon et al. | 206/1.5 |
| 5,938,020 A | * | 8/1999 | Luckow | 206/308.1 |
| 5,944,181 A | * | 8/1999 | Lau | 206/308.1 |
| 6,155,417 A | * | 12/2000 | Flores et al. | 206/308.1 |
| 6,196,384 B1 | * | 3/2001 | Belden, Jr. | 206/308.1 |
| 6,398,022 B1 | * | 6/2002 | Mou et al. | 206/308.1 |

* cited by examiner

Primary Examiner—Shian Luong

(57) ABSTRACT

A case can hold a disc that has a central hole and a predetermined outside diameter. The case has a pair of wings with a hinge joint for allowing the wings to swing between an open and a closed condition. The wings in the closed position are adapted to releasably hold the disc at a predetermined disc location between the wings with clearance at the periphery of the disc. This clearance allows loading and unloading of the disc in the open condition without interference. The wings have at least a pair of members for encaging the disc in order to impede removal of the disc in any direction around any one of the members. In the closed condition the members extend from the inwardly facing surface of one of the wings, transversely past the predetermined disc location, to a position at the inwardly facing surface of the other wing, in order to prevent removal of the disc. The pair of members are positioned to avoid overhanging the disc. Thus, the disk can be loaded squarely and held in the predetermined location without engaging the members.

29 Claims, 4 Drawing Sheets

CASE WITH MEMBERS FOR IMPEDING DISC REMOVAL

BACKGROUND OF THE INVENTION

1. Field of the Invention

The present invention relates to cases for holding discs, and in particular, to cases that have security or tamper resistant features.

2. Description of Related Art

A large market exists for discs that are digitally encoded with data, audio or video information. Data discs are distributed containing databases, text material, computer programs, or other forms of software. Audio discs containing music and the like are widely distributed as music CDS. New formats and technology now enable a higher density of information, so that discs can be distributed containing the video information of a full length movie. The latter discs are widely distributed as DVD discs.

Because of the relatively small size of such discs, pilferage has always been a concern. With the relatively higher purchase price of DVD discs this concern is heightened. Consequently, there is a great concern about a loss of revenue by the rights holders, disc manufacturers, distributors, and retailers.

A known security method involves incorporating a separate removable security rod that is inserted into the front seam of a case holding the disc. This rod may be a passive device that can be detected if the case is removed from a store without being disabled by a clerk at the time of purchase.

This type of case is relatively expensive to manufacture, is incompatible with high-speed packaging equipment, and requires the store clerk to use a special tool in order to remove the security rod from the rest of the case. This type of security design is suitable for stores renting DVDs, but not for retail "sell through" product.

Regardless, the security rod approach can be defeated by persistent thieves. A thief can slit the shrink wrap plastic along either the top or bottom edge (edges adjacent the hinge) of the polypropylene case. Twisting of the case will cause the disc to pop off its center holding spindle. Then, the thief squeezes the front and rear of the case to widen the opening of the standard straight seam, so that the disc can be removed. The empty case is then returned to the shelf and the relatively small disc can be concealed in a pocket, etc.

In U.S. Pat. No. 6,155,417 a DVD can rest atop a ring 35 underneath the five hooks 34a–34e. Button 28 can be depressed in order to insert or remove the disk. Automatic insertion of a disk would involve engaging and deflecting the hooks, which will produce undesirable stress and reduce the speed of insertion. Regardless, if a thief should flex or twist this case, the disc is held over most of its circumference by the overhanging hooks and will therefore flex and possibly break.

In FIG. 7 of U.S. Pat. No. 5,263,580 an optical disc can fit under hooks and be locked in place by slide 16. Hooks 15 will overhang the disc and therefore interfere with automatic insertion. The case has a number of peripheral stoppers for supporting the disc, but these are ineffective to prevent illicit disc removal.

In FIGS. 7A and 7B of U.S. Pat. No. 5,697,497 a user can flex case 186 to align the blocking members 180–184 and allow removal of a booklet; but this reference has no teachings on preventing unauthorized removal of a disc.

In U.S. Pat. No. 5,383,553 a jewel case for a CD has a modified hinge to prevent a thief from unfastening the hinge in order to remove the CD. This design will not defeat a thief that slits the shrink wrap and squeezes the case in order to remove the disc.

In U.S. Pat. No. 5,101,971 a CD case has a lid with a projection 38 that fits into a recess on the base. This design facilitates opening the case with one hand and is not designed for security purposes. See also U.S. Pat. No. 4,363,403 (videocassette storage container); and U.S. Pat. No. 5,168,991 (case sold open).

Accordingly, there is indeed for an article of manufacture designed to prevent the unauthorized removal of discs from their case. Preferably, the article will eliminate the need for a security rod and instead will incorporate a theft deterrent feature into the case design.

SUMMARY OF THE INVENTION

In accordance with the illustrative embodiments demonstrating features and advantages of the present invention, there is provided a case for a disc having a central hole and a predetermined outside diameter. The case has a pair of wings with a hinge joint for allowing the wings to swing between an open and a closed condition. The wings in the closed position are adapted to releasably hold the disc at a predetermined station between the wings. The wings have at least a pair of members for encaging the disc in order to impede removal of the disc in any direction around any one of the members. In the closed condition the members extend from the inwardly facing surface of one of the wings to a position at the inwardly facing surface of the other wing.

In accordance with another aspect of the present invention a case is provided for a disc having a central hole. The case has a pair of wings with a hinge joint for allowing the wings to swing between an open and a closed condition. One of the wings is adapted to releasably hold the disc at a predetermined location with clearance at the periphery of the disc to allow loading and unloading of the disc in the open condition without interference. The wings have at least a pair of members. In the closed condition the members transversely extend past the predetermined location in order to interfere with removal of the disc. The pair of members are positioned to avoid overhanging the disc. Thus, the disk can be loaded squarely and held in the predetermined location without engaging the members.

By employing apparatus of the foregoing type, an improved case is achieved for securely holding a disc. In a preferred embodiment two or more posts are molded into the inwardly facing surface of one of the wings of the case. For a hinged case having a rectangular outline, these posts may be placed at the two corners opposite the hinge joint. By judiciously placing the posts, the posts to post spacing and the spacing from each post to the hinge joint will be less than the outside diameter of the disc. Therefore, the disc cannot slide radially past the posts.

In this preferred embodiment, the posts will have an upright portion and a slanted portion that slants in a direction toward the center of the disc. This slanted portion can flex relative to the upright portion. Accordingly, the overall height of the unflexed post when the case is open, can exceed the wing to wing spacing when the case is open. When the case is closed the posts can be compressed or flexed by the wings to eliminate any passage over the top of the posts.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
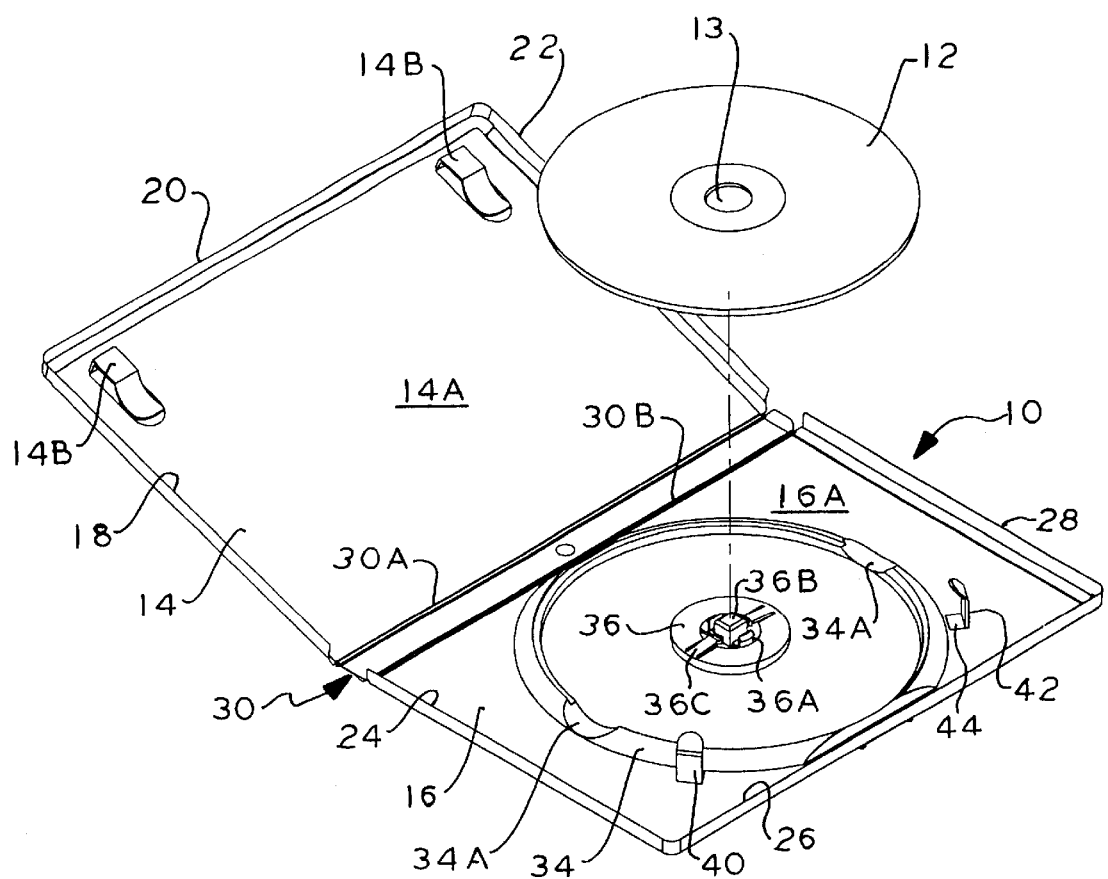
FIG. 1 is a perspective view of a case in accordance with principles of the present invention.
Figure 2A:
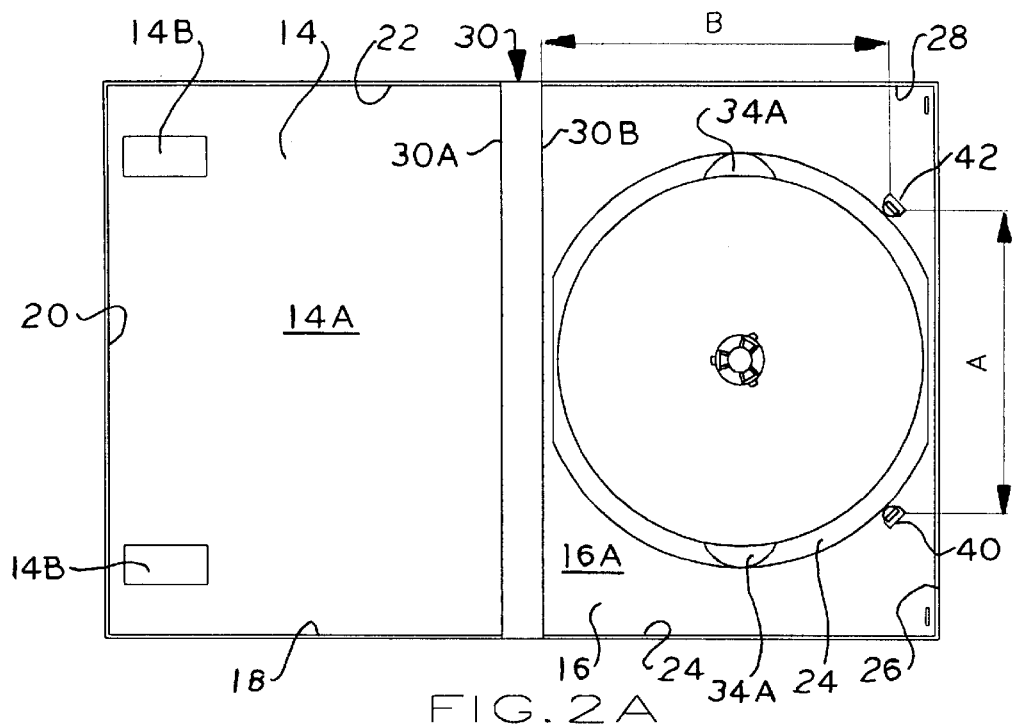
FIG. 2A is an inside view of the case of FIG. 1 placed in an open condition.
Figure 3:
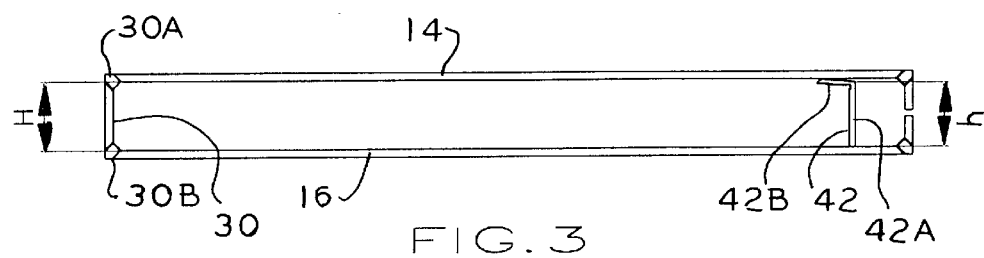
FIG. 3 is a cross-sectional view of the case of FIG. 1 in a closed condition.

Referring to FIGS. 1, 2A, and 3, case 10 is designed to hold a disc 12 having a predetermined outside diameter and a central hole 13. Disc 12 is in this instance a DVD disc, although other types of discs may be accommodated, including discs for storing data, software, audio (music CDS), etc. Case 10 has a pair of wings 14 and 16 shown with inwardly facing surfaces 14A and 16A, respectively, each having a rectangular outline bordered by sidewalls. Specifically, wing 14 has upright sidewall segments 18, 20, and 22; while wing 16 has upright sidewall segments 24, 26, and 28. Wing 14 has integral clips 14B that may be used to hold printed material concerning the contents of case 10.

Wings 14 and 16 are hinged together at hinge joint 30, which is a substantially flat narrow strip. In the preferred embodiment, strip 30 and wings 14 and 16 (including their sidewalls) are molded as a single piece with the interface between strip 30 and the wings 14, 16 formed as live hinges 30A and 30B. Live hinges 30A and 30B each provide separate hinge axes but are comprehensively referred to herein as a hinged joint 30 for the wings 14 and 16.

In some embodiments the wings 14 and 16 may be separate pieces that snap together using integral stubs and cavities (not shown) that work as a hinge. Alternatively, one or more separate pins can be used to hinge the wings together. In some embodiments a flexible transparent cover (not shown) may be secured to the outside of case 10 by heat sealing along the opposite edges of wings 14 and 16. If this cover is not sealed along the adjacent edges, then descriptive or promotional material can be easily inserted between the transparent cover and the wings 14 and 16.

Wing 16 has an annular embossment 34 that serves as a circular platform to underlie and subjacently restrict disc 12. Embossment 34 is truncated alongside sidewall 26 to provide clearance. Embossment 34 also has a pair of diametrically opposed recesses 34A providing finger clearance to facilitate lifting of disc 12 off embossment 34.

Centered within embossment 34 is a support, shown as spindle 36. In this embodiment spindle 36 has a pair of radially aligned clips 36A designed to latch into central hole 13 of disc 12. In this embodiment, central button 36B is connected by live hinges to clips 36A. Depression of button 36B deflects clips 36A to release disc 12, which is then pushed away from the clips by a pair of radially aligned, cantilevered spring arms 36C. It will be appreciated that a number of well-known supports exist that can hold disc 12 at its central hole 13. Accordingly, the design specifics of support 36 can be freely varied without departing from the scope of the present invention.

In the illustrated embodiment, spindle 36 as well as embossment 34 are integrally molded together as part of wing 16. Nevertheless, in some embodiments support 36 and embossment 34 may be one or more separate components. For example, embossment 34 and support 36 may be integrally molded as an insert panel that is sized to fit within the confines of sidewalls 24, 26, and 28, without interfering with the action of live hinge 30B. This insert panel may provide a false floor to wing 16 and may be held in place by a snap action, force fit, gluing, etc. As an example of this type of insert arrangement, see U.S. Pat. No. 5,383,553.

A pair of engaging members 40 and 42 are shown integrally molded on wing 16. Each of the members 40 and 42 are adjacent to through holes 44, which are used in a known manner to facilitate molding of the members 40 and 42. Each of the members 40 and 42 have an upper slanted portion that slants in a radially inward direction, that is, in a direction toward spindle 36.

Figure 4A:
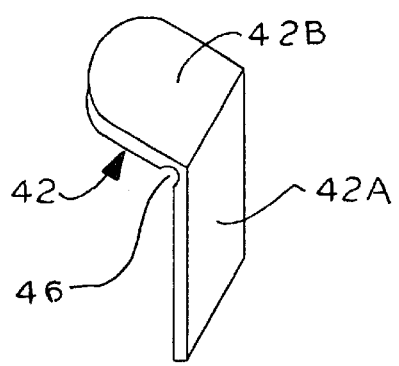
FIG. 4A is a detailed perspective view of one of the encaging members of FIG. 1.

Referring to FIG. 4A, previously mentioned encaging member 42 is shown in greater detail. It will be appreciated that member 40 is substantially the same. Member 42 is shown with an upright portion 42A and a slanted portion 42B which connect together at an oblique angle. The inside corner of portions 42A and 42B is relieved to form live hinge 46. Member 42 is considered hooked.

Figure 4B:
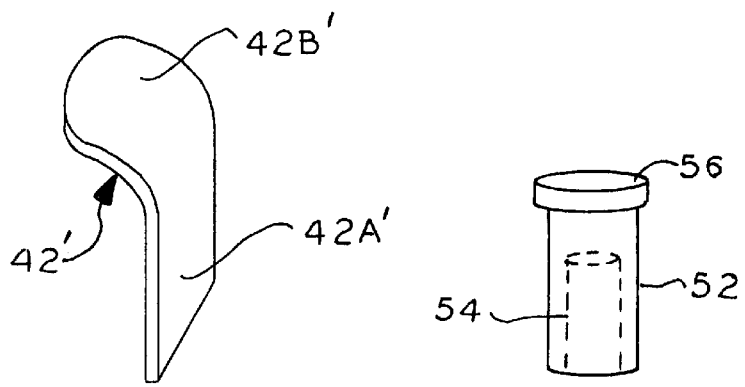
FIGS. 4B, 4C, and 4D are detailed perspective views of an encaging member that is an alternate to that of FIG. 4A.

Referring to FIG. 4B, an alternate member 42' is illustrated as an alternative to that of FIG. 4A. Member 42° has an upright portion 42A' and a slanted portion 42B', the joint between them being cylindrically curved so that the transition between the portions is less distinct. In some embodiments the entire member may be curved (for example, a quadrant of a hollow cylinder) so that the distinction between an upright and slanted portion is lost, although the member may still be considered hooked. Flexing may still occur between the upright portion 42A' and slanted portion 42B', but without a live hinge flexing may also occur throughout the length of the member 42'.

Figure 4C:
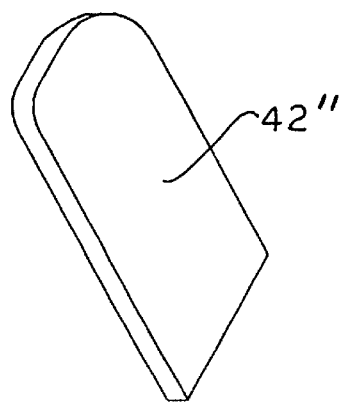

Referring to FIG. 4C, encaging member 42" is illustrated as another alternative to that of FIG. 4A. Member 42" is shown as a flat tab that is slanted radially inward as before. Member 42" may also flex along its entire length as well as at its base.

Figure 4D:
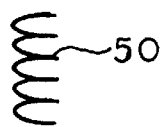
Figure 4D:
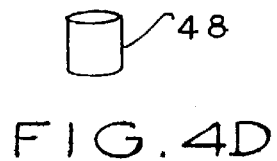

Referring to FIG. 4D, an encaging member is shown as another alternative to that of FIG. 4A. This member includes a cylindrical post 48 that is integrally molded into one of the previously mentioned wings. A plunger 52 is shown with disc-like head 56 and a blind hole 54 designed to receive compression spring 50. Plunger 52 may be fitted onto post 48, which will slide into blind hole 54 to compress spring 50. Plunger 52 may be kept on post 48 by an appropriate locking mechanism (not shown).

Referring to FIG. 2A, it is desirable to distribute the members 40, 42, so that a disc cannot move in the plane of surface 16A without being caught between members 40, 42 or between one of the members 40, 42 and the hinge joint 30. For example, the distance A between members 40, 42 is chosen to be less than the outside diameter of the disc (disc 12 of FIG. 1). Therefore, the disc cannot pass between members 40, 42. Also, the distance B between member 42 and hinge joint 30 is also less than the outside diameter of the disc. Therefore, if the disc should move in a direction between member 42 and hinge joint 30, the disc will again be caught between those elements. Member 40 is also spaced from hinge joint 30 by the distance B, so that the disc cannot pass between them either.

Members 40 and 42 are shown with an angular spacing of about 90°, but other angular spacings are possible, provided members are positioned to keep the disc encaged.

Figure 2B:
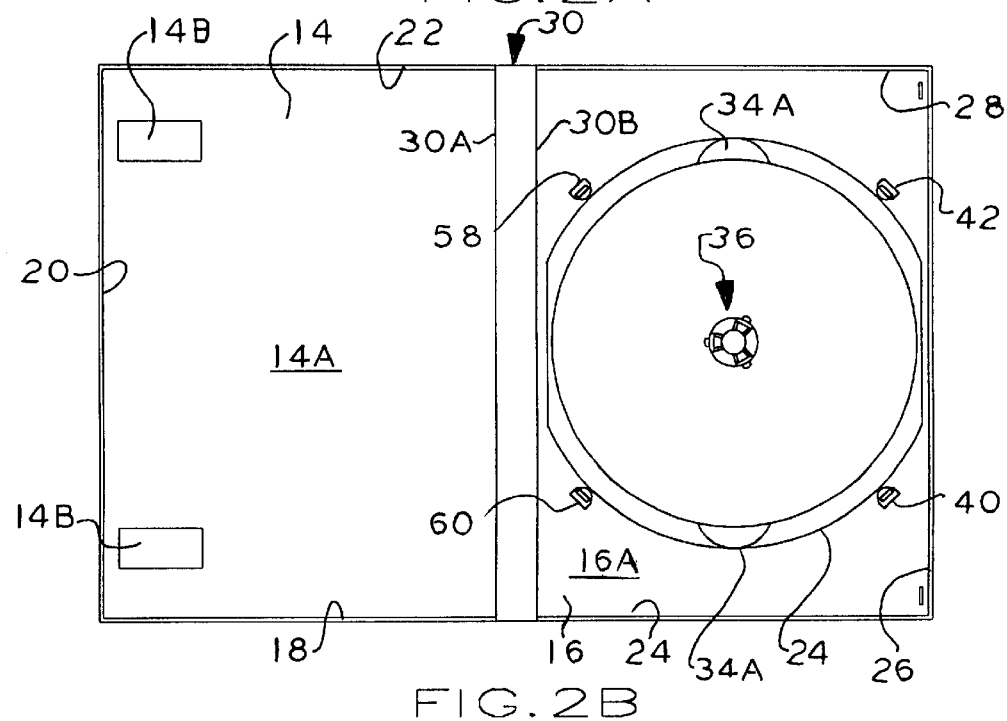
FIG. 2B is an inside view of a open case that is an alternate to that of FIG. 2A.

Referring to FIG. 2B, a modified case is illustrated wherein components corresponding or identical to those previously illustrated in FIG. 2A, bear the same reference numeral. This illustrated case differs in that it has two additional encaging members 58 and 60 that are identical to members 40 and 42 but are placed in different locations. Essentially members 40, 42, 58 and 60 are equiangularly spaced by 90°. Each of these members are placed in different respective corners, but may be positioned otherwise in other embodiments. For example, in some embodiments these members may be placed in the top (12 o'clock), bottom (6 o'clock), right (3 o'clock), and left (9 o'clock) positions. In still other embodiments members may be placed in the 12 o'clock, 3 o'clock, and 9 o'clock positions. In still other embodiments more than four encaging members may be used, depending upon the desired level of security. Moreover, in some embodiments the encaging members may be placed on both of the wings so that the above mentioned spacings (for example distances A and B) come into play when the wings are closed.

Figure 5A:
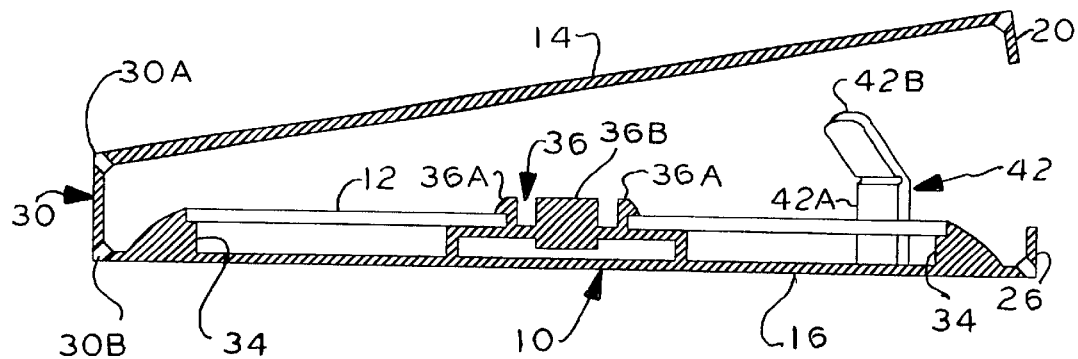
FIG. 5A is a cross-sectional, edge view of the case of FIG. 1 holding a disc while in an open condition.

To facilitate an understanding of the principles associated with the foregoing apparatus, its operation will be briefly described in connection with the diagrams of FIGS. 5A through 5C. In FIG. 5A disc 12 has been loaded onto spindle 36. With wing 14 fully opened (FIG. 2A) disc 12 can be automatically loaded by machine since members 40 and 42 are outside the predetermined location occupied by disc 12; that is, the circular region encompassed by annular embossment 24. Therefore, members 40 and 42 and all other structure on wing 16 do not interfere with the disc being loaded squarely onto spindle 36. This loading takes place as the central hole 13 of disc 12 rides over the tapered surfaces of locking members 36A to snap into the position shown in FIG. 5A. Disc 12 can be manually released by depressing button 36B, which tilts locking members 36A radially inward.

Figure 5B:
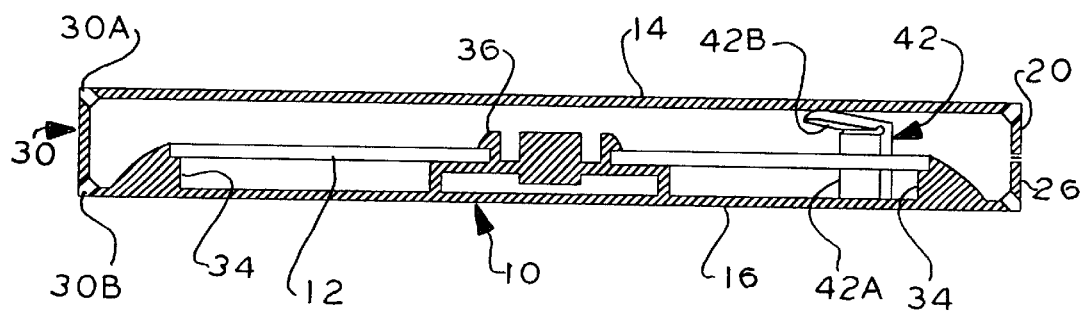
FIG. 5B is a cross-sectional, edge view of the case of FIG. 5A in a closed condition.

With the disc loaded at its predetermined station on spindle 36, wing 14 may be snapped closed as shown in FIG. 5B. Thereafter, case 10 can be wrapped in cellophane or shrink wrap plastic in the usual fashion. It will be noticed that the slanted portion 42B is depressed by the closing of wing 14 to reduce the overall height of member 42. The wings 14 and 16 are still able to close since as shown in FIG. 3, the height h of upright portion 42A is less than the clearance H between the wings 14 and 16. Significantly, there is no clearance above or below member 42 since slanted portion 42B is pressed against the inwardly facing surface of wing 14, and upright portion 42A is molded onto the inwardly facing surface of wing 16.

Figure 5C:
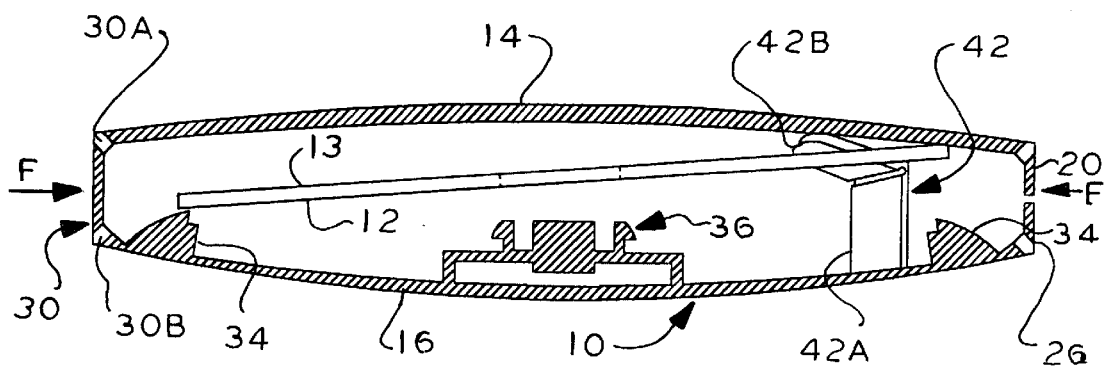
FIG. 5C is a cross-sectional, edge view of the case of FIG. 5B forced into a distorted condition were the disc has been displaced from the spindle.

Referring to FIG. 5C, a thief has twisted case 10 or squeezed it by applying compressive force F. Consequently, wing 16 bows as illustrated, causing spindle 36 to descend relative to annular embossment 34. This deformation causes disc 12 to pop off the spindle 36. If not done already, the thief may now slit the wrapper at the juncture between sidewalls 22 and 28 (FIG. 2A). If the thief now attempts to remove disc 12 through this slit (a direction into the plane of FIG. 5C), there is insufficient clearance. Specifically, the outside diameter of disc 12 is greater than the distance between member 42 and hinge joint 30. If the thief attempts to remove disc 12 in the opposite direction, there is still insufficient clearance between member 40 and hinge joint 30 (FIG. 2A). Likewise, any attempt to remove disc 12 in a direction away from hinge joint 30 will fail because there is insufficient clearance between members 40 and 42 as shown in FIG. 2A.

With any of these attempts, the slanted portions of members 40 and 42 remain in contact with the inwardly facing surface of wing 14. This eliminates any clearance that would allow removal of disc 12 over these members. Also, manipulating case 10 to create clearance is precluded by the radially inward slant of the slanted portions (for example, slanted portion 42B). As shown in FIG. 5C, any outward pressure exerted by disc 12 against slanted portion 42B will only drive that slanted portion more tightly against the inwardly facing surface of wing 14.

It is appreciated that various modifications may be implemented with respect to the above described, preferred embodiment. For example, the illustrated case can be made of a variety of materials composed of one or more components. Additionally, the dimensions of the case can be altered depending upon the size of the disc and the desire to make the case either portable or obtrusive. Furthermore, the outline of the case can be polygonal, circular, oval or have other shapes. In still other embodiments the case can have multiple wings for storing more than one disc. Moreover, some cases may have wings with non-continuous or non-flat surfaces pierced by one or more apertures for various purposes.

Obviously, many modifications and variations of the present invention are possible in light of the above teachings. It is therefore to be understood that within the scope of the appended claims, the invention may be practiced otherwise than as specifically described.

What is claimed is:

1. A case sized to hold in a circular region having a predetermined diameter a disc having a central, comprising:

a pair of wings having inwardly facing surfaces and a hinge joint for allowing said wings to swing between an open and a closed condition, said wings in said closed condition being adapted to releasably hold said disc at a predetermined station between said wings, said wings having at least a pair of members for encaging said disc in order to impede removal of said disc in any direction around any one of said members, said members being positioned to avoid overhanging said circular region and to allow said disc to be loaded squarely without engaging said members, said wings in said closed condition normally meeting along a juncture to provide an encircling enclosure around said members without an opening that would allow removal of said disc, in said closed condition each of said members being disposed from the inwardly facing surface of a supporting one of said wings (a) further than the juncture, and (b) to a position releasably engaging the inwardly facing surface of the other wing.

2. A case according to claim 1 wherein each of said pair of members is mounted on one of said wings and is sized to engage the inwardly facing surface of the other one of said wings in said closed condition.

3. A case according to claim 1 wherein each of said pair of members is spaced from said hinge joint less than said predetermined diameter.

4. A case according to claim 3 wherein said pair of members are located on the same one of said wings.

5. A case according to claim 1 wherein said pair of members in said closed condition are spaced apart less than said predetermined outside diameter.

6. A case according to claim 5 wherein each of said pair of members are spaced from said hinged joint less than said predetermined diameter.

7. A case according to claim 6 wherein each of said pair of members is mounted on one of said wings and is sized to engage the inwardly facing surface of the other one of said wings in said closed condition.

8. A case according to claim 6 wherein said pair of members in said closed condition are spaced from said hinged joint more than halfway across said wings.

9. A case according to claim 5 wherein each of said members is hooked.

10. A case according to claim 5 wherein said case comprises:
a spindle for releasably supporting said disc, each of said members having a portion that hooks radially inward toward said spindle.

11. A case according to claim 5 wherein each of said members has an upright portion supported on one of said wings and a slanted portion extending distally from said upright portion.

12. A case according to claim 11 wherein said case comprises:
a spindle for releasably supporting said disc, said slanted portion slanting radially inward toward said spindle.

13. A case according to claim 11 wherein said upright has a height that is less than the spacing between the wings in said closed condition.

14. A case according to claim 11 wherein said slanted portion extends from said upright portion at an oblique angle.

15. A case according to claim 11 wherein said slanted portion can flex relative to said upright portion.

16. A case according to claim 15 wherein said slanted portion and said upright portion are connected by a live hinge.

17. A case according to claim 5 wherein said pair of wings and said pair of members are integrally molded.

18. A case according to claim 5 wherein said wings have adjacent said members a corresponding pair of through holes.

19. A case according to claim 5 wherein said hinge joint includes a live hinge, said pair of wings each having a plurality of sidewalls adjacent perpendicular to said wings.

20. A case according to claim 1 wherein each of said pair of members is deformable and has an overall height that is less in said closed condition than in said open condition.

21. A case according to claim 1 wherein at least a portion of each of said pair of members is slanted relative to said wings.

22. A case according to claim 1 wherein said case comprises:
a spindle for releasably supporting said disc centered in said predetermined station within a circular region, said members in said closed condition being adjacent to said circular region.

23. A case according to claim 22 wherein said members are positioned to avoid overhanging said circular region, so that said disc can be loaded squarely onto said spindle without engaging said members.

24. A case according to claim 23 wherein said pair of members in said closed condition are spaced apart less than said predetermined diameter, each of said pair of members being spaced from said hinge joint less than said predetermined diameter.

25. A case according to claim 1 wherein said pair of members are positioned to avoid overhanging said disc, so that said disc can be loaded squarely onto said spindle without engaging said members.

26. A case according to claim 1 wherein each of said members has an upright portion supported on one of said wings and a slanted portion extending distally from said upright portion.

27. A case for a disc having a central hole, comprising:
a pair of wings having a hinge joint for allowing said wings to swing between an open and a closed condition, one of said wings being adapted to releasably hold said disc at a predetermined location with clearance at the periphery of said disc to allow loading and unloading of said disc in said open condition without interference, said wings having at least a pair of members, in said closed condition said members transversely extending past said predetermined location in order to interfere with removal of said disc, said pair of members being positioned to avoid overhanging said disc, so that said disk can be loaded squarely and held in said predetermined location without engaging said members, said wings in said closed condition normally meeting along a juncture to provide an encircling enclosure around said members without an opening that would allow removal of said disc, in said closed condition each of said members being disposed from an inwardly facing surface of a supporting one of said wings (a) further than juncture, and (b) to a position releasably engaging an inwardly facing surface of the other wing.

28. A case according to claim 27 wherein each of said pair of members is deformable and has an overall height that is less in said closed condition than in said open condition.

29. A case according to claim 27 wherein at least a portion of each of said pair of members is slanted relative to said wings.

* * * * *